US008898523B2

(12) United States Patent
Vecera et al.

(10) Patent No.: US 8,898,523 B2
(45) Date of Patent: Nov. 25, 2014

(54) GENERATING IMPERATIVE TEST TASKS FROM DECLARATIVE TEST INSTRUCTIONS

(75) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 26 days.

(21) Appl. No.: 12/551,461

(22) Filed: Aug. 31, 2009

(65) Prior Publication Data

US 2011/0055633 A1 Mar. 3, 2011

(51) Int. Cl.
*G06F 11/00* (2006.01)
*G06F 11/22* (2006.01)
*G06F 11/36* (2006.01)

(52) U.S. Cl.
CPC ................ *G06F 11/3688* (2013.01)
USPC ................ 714/32; 714/25; 714/46

(58) Field of Classification Search
USPC ................ 714/25, 32, 46, 47, 47.1
See application file for complete search history.

(56) References Cited

U.S. PATENT DOCUMENTS

| | | | | |
|---|---|---|---|---|
| 5,255,386 | A * | 10/1993 | Prager | 1/1 |
| 6,002,868 | A * | 12/1999 | Jenkins et al. | 717/105 |
| 6,286,035 | B1 * | 9/2001 | Gillis et al. | 709/206 |
| 6,463,552 | B1 * | 10/2002 | Jibbe | 714/33 |
| 6,697,967 | B1 * | 2/2004 | Robertson | 714/43 |
| 7,464,297 | B2 * | 12/2008 | Potter et al. | 714/38 |
| 7,493,521 | B1 | 2/2009 | Li et al. | |
| 2004/0199818 | A1 * | 10/2004 | Boilen et al. | 714/25 |
| 2005/0144529 | A1 * | 6/2005 | Gotz et al. | 714/38 |
| 2007/0038890 | A1 | 2/2007 | El Far et al. | |
| 2008/0010553 | A1 * | 1/2008 | Betawar et al. | 714/46 |
| 2008/0130682 | A1 * | 6/2008 | Akadiri | 370/469 |
| 2008/0216053 | A1 | 9/2008 | Sluiman et al. | |
| 2009/0063999 | A1 | 3/2009 | Gaug et al. | |
| 2009/0307763 | A1 * | 12/2009 | Rawlins et al. | 726/5 |
| 2010/0057405 | A1 | 3/2010 | Wu | |
| 2010/0100872 | A1 | 4/2010 | Mitra | |
| 2011/0055635 | A1 | 3/2011 | Vecera | |

OTHER PUBLICATIONS

JBOSS Enterprise SOA Platform, www.redhat.com/jboss, 2007, 5 pgs.
JBOSS ESB 4.4 GA, Getting Started With Jboss ESB, JBESB-GS—Aug. 5, 2008, 13 pgs.
JBOSS ESB, What is an ESB?, http://www.jboss.org/jbossesb/resources/VVhatIsAnESB.html, Dec. 16, 2008, 2 pgs.
"Apache Ant Demystified—Parts 1 and 2", Server-side Coding, Java and J2EE, www.sitepoint.com/print/apache-ant-demystified, Aug. 31, 2009, 11 pgs.
U.S. Appl. No. 12/551,441, Non-Final Office Action dated Jun. 24, 2011.
U.S. Appl. No. 12/551,441, Final Office Action dated Jan. 19, 2012.
U.S. Appl. No. 12/551,441, Non-Final Office Action dated Jun. 7, 2012.
U.S. Appl. No. 12/551,441, Final Office Action dated Sep. 20, 2012.
U.S. Appl. No. 12/551,441, Non-Final Office Action dated Mar. 27, 2013.
U.S. Appl. No. 12/551,441, Non-Final Office Action dated Oct. 4, 2013.

\* cited by examiner

*Primary Examiner* — Joseph Schell
(74) *Attorney, Agent, or Firm* — Lowenstein Sandler LLP (57) ABSTRACT

A test controller interprets declarative test instructions into imperative test tasks and runs the tests using the imperative test tasks. Declarative test instructions indicate what tests are to be run and the imperative test tasks indicate how these tests are to be run. In addition, the imperative test tasks further indicate a control flow of the running of the tests.

16 Claims, 6 Drawing Sheets

FIG. 1

```
<execution>
    <run id="deployer" target="deploy" />    ← 202A
    <sleep seconds="1" />    ← 202B <run id="runner" target="runtest" />← 202C <sleep seconds="1" />← 202D <run id="undeployer" target="undeploy" />← 202E </execution>
```

GENERATING IMPERATIVE TEST TASKS FROM DECLARATIVE TEST INSTRUCTIONS

TECHNICAL FIELD

Embodiments of the present invention relate to a method and system for executing tests. Specifically, embodiments of the invention relate providing a mechanism to interpreting declarative test instructions into imperative test tasks that can be used to run the tests.

BACKGROUND

Software tests are used to validate software, hardware, or a combination of software and hardware. To run the tests, a quality engineer (QE) manually configures and runs the test, which can be a laborious for involved tests. Alternatively, the tests can be automatically executed using test execution code, which configures test devices and runs the tests. Although having test execution code may be more effective than manually running the test, this requires a QE to write and maintain the test execution code. Test instructions are typically written as imperative instructions, meaning the QE has to specify in the test instructions how the test are run. More specifically, the QE has to specify the control flow of the tests. This can be a difficult task, especially when there are a large number of tests that need to be run.

DETAILED DESCRIPTION

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

A test controller translates declarative test instructions into imperative test tasks, where the imperative test tasks are subsequently used to run the tests. Declarative test instructions indicate what tests are to be run and imperative test tasks indicate how these tests are to be run. Declarative test instructions can specify running of a test, stopping a test, or temporarily pausing a running test. In one embodiment, the declarative test instructions are stored in an extended markup language formatted file. The test controller executes these imperative test tasks to run the tests.

In another embodiment, the declarative test instructions can be used to test different devices and/or products. The test controller interprets the declarative test instructions into imperative test tasks that are specific for the actual device and/or product under test.

Figure 1:
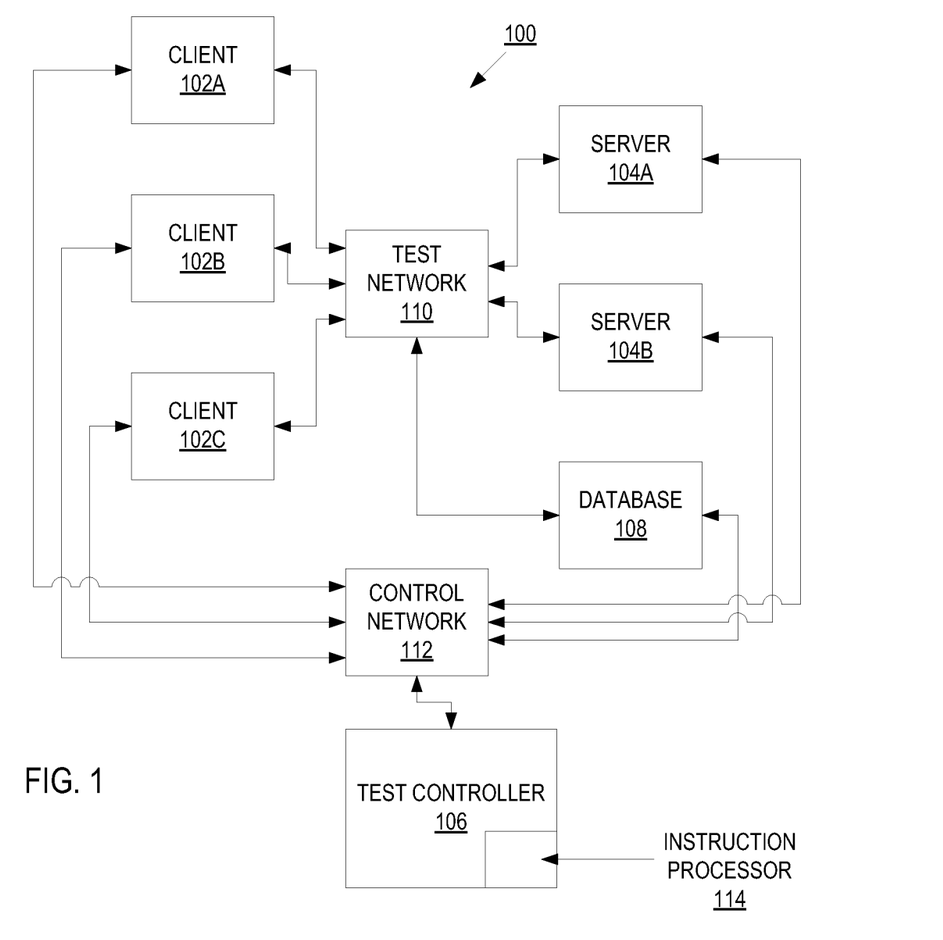
FIG. 1 is a block diagram of one embodiment of a testing system that includes a test controller.

FIG. 1 is a block diagram of one embodiment of a testing system 100 that includes a test controller 106 to control the running of tests of servers 104A-B with test clients 102A-C. In one embodiment, running of a test can include: configuring the one or more device being used in the test (e.g., test clients 102A-C, serves 104A-B, database 108, etc., or a combination thereof); moving data to the devices being used in the test (e.g. moving data between one or more of (e.g., test clients 102A-C, serves 104A-B, database 108, etc., or a combination thereof); running the test (e.g., running the test as described in FIGS. 1 and 3 below), checking the data; restoring the test devices to the original state (setting up and cleaning databases, e.g., database 108).

Testing system 100 includes a test network 110 that couples testing clients 102A-C, servers 104A-B, and database 108. In one embodiment, test network 110 allows data communications between the devices coupled to this network. For example and in one embodiment, the test network is a testbed for testing servers 104A-B and/or database 108. Testing clients 102A-C can be one of a personal computer, laptop, cell phone, smartphone, settop box, personal digital assistant, music player, or another type of device that can interact with servers 104A-B. In one embodiment, testing clients 102A-C are used to test servers 104A-B. Any type of test known in the art can be run using testing clients: validation tests, stress tests, performance tests, saturation tests, integration tests, etc. Servers 104A-B are servers known in the art, such as a web server, a file server, mail server, application server, enterprise server bus (ESB) servers, etc. and are the devices that are subject to the tests by testing clients 102A-C. In one embodiment, servers 104A-B are JBOSS Enterprise™ ESB servers from JBOSS™, a division of RED HAT™, Incorporated of Raleigh, N.C. While in this embodiment, three testing clients and two testing servers are illustrated, in alternate embodiments, the same, more, or less numbers of testing clients and/or servers can be used. Database 108 stores data used in the tests, such as input data, configurations, test results, etc.

Furthermore, testing system 100 includes a control network 112 that is used to couple test controller 106 with clients 102A-C, servers 102A-B, and database 108. In one embodiment, test controller 106 controls the execution or running of the tests. In this embodiment, a test can compose of one or more of: configuring the devices used in the tests; sending the test instructions to the test devices; executing the tests; collecting the test results; unconfiguring the test devices; and validating the test results. As mentioned above, running the tests can be done manually by a QE or automatically executed using imperative test tasks for each of the tests. In one embodiment, instead of the QE writing imperative test tasks to execute the tests, the QE specifies a set of declarative test instructions that will be used to run the test. In one embodiment, these instructions are declarative statements, where the declarative statements are used to specify what tests should be run. This is in contrast to an imperative statement, which specifies how a test is to be run. In other words, imperative test tasks will layout the control flow of the tests, where declarative test instructions specify what tests are to be run. For example and in one embodiment, the declarative test instructions can specify the configuration of the test clients 102A-C and/or test servers 104A-B, which tests should be run, which external commands and scripts should be run, which previously executed processes should be stopped, etc. Each of these instructions is translated into imperative test tasks that are executed to run the tests. In one embodiment, a instruction processor 114 processed these declarative test instructions into imperative test tasks that can be used to run the tests. For example and in one embodiment, instruction processor 114 interprets the declarative test instructions that are in an eXtended Markup Language (XML) format to run the test. Alternatively, instruction processor 114 can interpret and/or execute the declarative test instructions that are formatted in another type of format known in the art: scripting languages (PERL, TCL, C Shell, etc.), text, etc. In one embodiment, test controller 106 runs the tests using the generated imperative test tasks.

In one embodiment, the declarative test instructions are defined in an template that is translated into XML formatted file. In one embodiment, a instructions processor translates the template into an XML-formatted file, such as instructions processor 114 of FIG. 1. The template allows the QE to input a minimal descriptions that describe what tests are run and this description is eventually processed into imperative test tasks that can be used to run the tests. The template allows the QE to specify the declarative test instructions in a declarative language instead of manually developing the software code used for ruining the tests. Instruction processor 114 processes the declarative test instructions into an XML formatted file. As another example and in another embodiment, instructions processor 114 builds an XML formatted file that includes code to indicate what configuration to use, what tests to run, and how to roll back the completed tests as described below in FIG. 2.

For example and in one embodiment, a text file can have the declarative instructions:

1. In a command terminal window in this folder ("Window1"), type 'ant deploy'.
2. Open another command terminal window in this folder ("Window2"), type 'ant runtest'.
3. Switch back to Application Server console to see the output from the ESB
4. In this folder ("Window1"), type 'ant undeploy'.

In one embodiment, instructions processor 114 builds different imperative test tasks for different devices, products, etc. under test. For example, and in one embodiment, there is a different translation for testing a web server, ftp server, ESB server, etc. In this embodiment, a different set of tasks can be generated for the different device under test. For example and in one embodiment, different XML dictionaries can be used to generate different XML declarative commands. For example and in one embodiment, a test instruction for executing a performance test is:

```
<performance address="http://localhost:8080/Ebws/PerfTest/EBWS"
sender="HTTPSender" generator="DefaultMessageGenerator"
message="5kB_ebws_reply.xml" count="5000" />
```

In this example, the performance test retrieves a file "5kB_ebws_reply.xml" 5000 times from the local host at port 8080. This XML declarative test instruction describes what test should be run, but does not explicitly indicate how the test should be run (e.g., which and/or how many test clients are used to run the performance test, etc.).

For example and in one embodiment, consider a QE that wishes to test an ESB server using Ant. As is known in the art, Ant is a build system used for Java applications and other languages. In this example, the QE would in a command terminal deploy the configuration to the ESB server and/or testing clients using the command "ant deploy." In another command terminal window, the QE would run the test with the command "ant runtest." The QE would view the output from the ESB server (e.g., in an Applications console window). The QE would restore the configuration of the ESR server and/or other test devices using the Ant command "ant undeploy."

Figure 2:
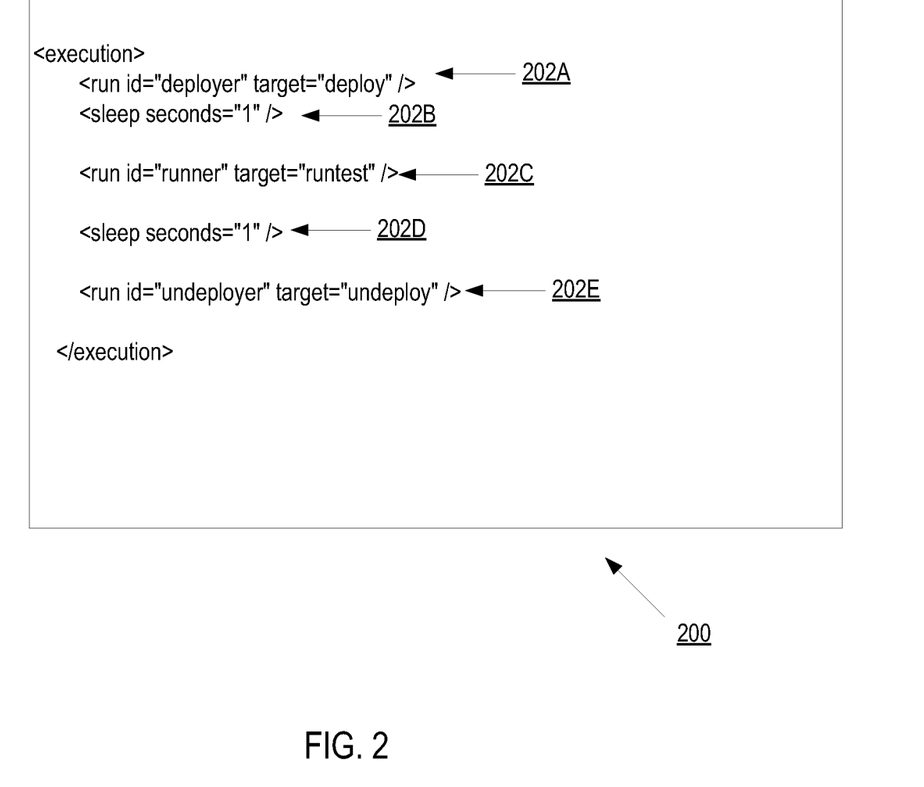
FIG. 2 is an exemplary embodiment of test instructions defined in as declarative test instructions.

In one embodiment, instead of manually inputting the commands to run the tests, the QE could use a template to specify running of a test with a particular input. This template, which includes the declarative test instructions, is translated into an XML formatted file of declarative test instructions. FIG. 2 is an exemplary embodiment of declarative test instructions 200 defined in an XML format. In FIG. 2, test instruction 200 is composed of individual test instruction 202A-E that are used to run the tests. Test instructions 202A-E can specify different commands that are used in running a test. For example, and in one embodiment, test instructions 200 can specify running of a test, stopping a test, or temporarily pausing a running test.

In one embodiment, test instructions 202A-E are an XML-formatted set of instructions. In one embodiment, the test instructions indicate a target, which the instructions processor 114 runs one or more tasks to reach the target. In one embodiment, each test instruction has a tag and can optionally include a set of attributes for that tag. For example, and in one embodiment, test instructions can have a "run,", "stop," or "sleep" tag. In this embodiment, a test instruction that has the tag "run" is used to indicate that a command is to be run using the attribute(s) included in the "run" command. In one embodiment, the "run" tag can execute an Ant target ("target" attribute), or any command (specified in the "command" attribute). The "Id" attribute is used to set an identification for the new process. This identification can be used in "stop" tag, and is also used to create a log file name (e.g. <ID>-output-.txt). Another attribute, "fork," can set the execution of the process in the background. Normally, the execution of the test instructions waits for each process from each "run" tag to finish.

For example and in one embodiment, test instruction 202A is used to run task(s) to deploy a configuration for a device used in a test. In this embodiment, test instruction 202A runs the target "deploy" with the identification of "deployer." In one embodiment, the "deploy" target can be used to deploy a particular configuration for a device under test. For example, and in one embodiment, the purpose of the test instruction 202A is to have compiled configuration classes and configuration files from an ESB archive in a server's deploy directory. If these compiled configuration classes and configuration files are located in the server's deploy directory, then no further action is taken by the instructions processor 114. Otherwise, the instructions processor 114 will copy some or all of the needed compiled configuration classes and configuration files into the server's deploy directory. This illustrates the different between the declarative and imperative test instructions. The target of test instruction 202A is met when the compiled configuration classes and configuration files in an ESB archive. Instructions processor 114 interprets test instruction 202A into a set of imperative task(s) how to make sure that these compiled configuration classes and configuration files are deployed into the server's deploy directory.

Test instructions 202B and 202D includes the tag "sleep", which pauses the the execution of the test instructions 200. For example and in one embodiment, test instructions 202B and 202D pauses the execution of the test instructions 200 for one second. This can be used when it takes time to deploy test artifacts. In another embodiment, a test instruction can include the "stop," which forcefully terminates a process executed by "run" tag (with the "fork" attribute set to true). The "stop" tag can have one attribute "id."

In addition, test instruction 202C is used to run task(s) to run the actual test. In this embodiment, test instruction 202C runs the target "runtest" with the identifier of "runner." In one embodiment, the "runtest" target can be used to run a test for the device under test. For example and in one embodiment, a compiled Java class is executed as a result of interpreting test instruction 202C.

Test instruction 202E is used to run task(s) to undeploy the results of the test and return the devices used in the test back to a state that can be subsequently used for running of other or the same tests. In this embodiment, test instruction 202E runs the target "undeployer" with the identification "undeploy." In one embodiment, the "undeploy" target can be used to restore a particular configuration for a device that was under test. For example, and in one embodiment, the previously deployed ESB archive is deleted from server's deploy directory.

Figure 3:
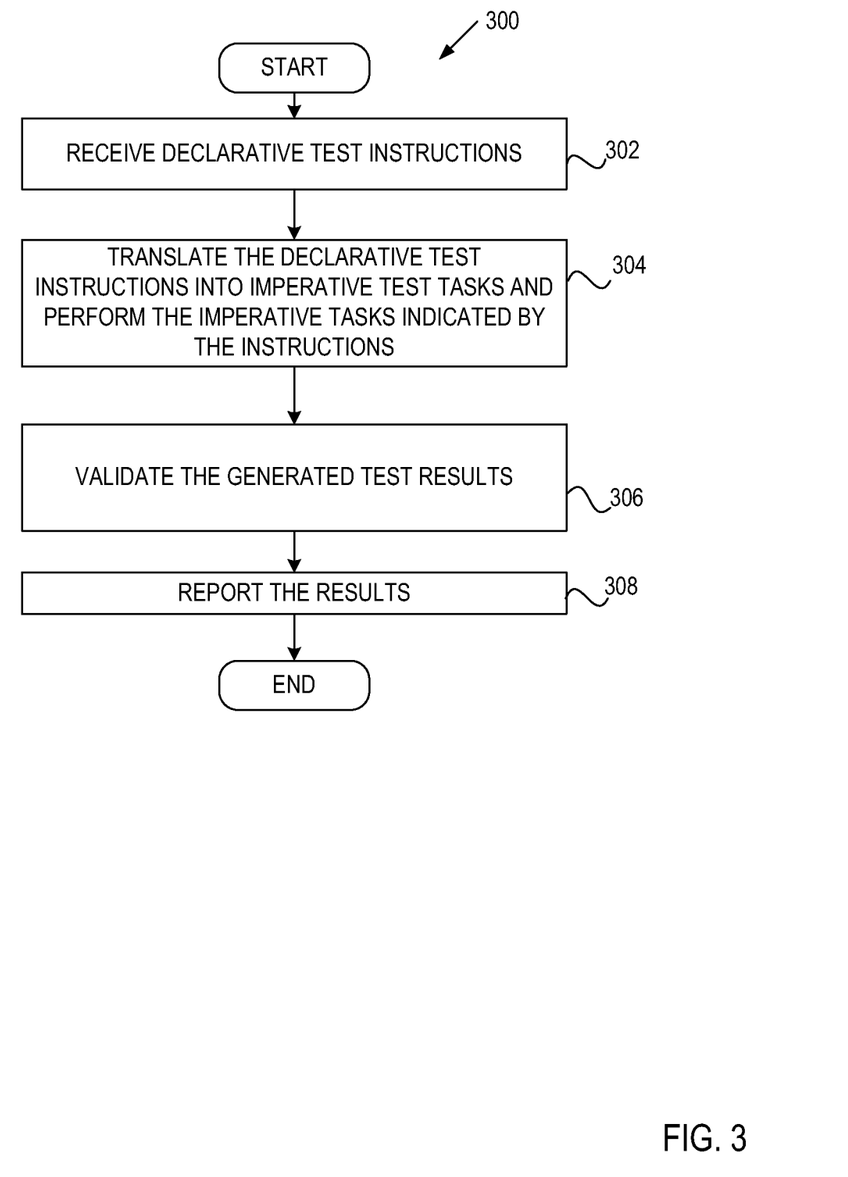
FIG. 3 is a flowchart of one embodiment of a process for executing tests using declarative test instructions.

FIG. 3 is a flowchart of one embodiment of a process 300 for translating and running the declarative test instructions. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 300 is performed by a test controller, such as test controller 106 of FIG. 1.

Referring to FIG. 3, process 300 begins with processing logic receiving the declarative test instructions at block 302. In one embodiment, the declarative test instructions process 300 receives are a set of test instructions that will be used to run the test as described in FIGS. 1 and 2 above. For example and in one embodiment, the declarative test instructions can specify running of a test, stopping a test, or temporarily pausing a running test, as described above in FIG. 2.

At block 304, process 300 interprets the declarative test instructions into imperative test tasks and performs that imperative tasks to run the tests. For example and in one embodiment, process 300 interprets the declarative test instructions into a set of executable tasks as described in FIG. 2 above. Process 400 further performs these executable tasks in this block. In one embodiment, process 300 performs declarative test instruction interpretation as described in FIG. 4 below.

At block 306, process 300 validates the generated test results. In one embodiment, the test results are validated manually by a QE. In another embodiment, process 300 invokes test validation code to validate the generated test results using a manner known in the art for executing code: invoking a binary executable, executing a JAVA bytecode, interpreting a script, etc. In one embodiment, the process 300 retrieves the test results and compares the test results with the expected test results. In one embodiments, the test results could be as a simple as pass/fail or can be have more information, such as an exception report describing the error. Process 300 reports the test results at block 308. Process 300 can report the results through a graphical user interface, save to a file, save to a database, report in an email, etc. and/or combinations thereof.

Figure 4:
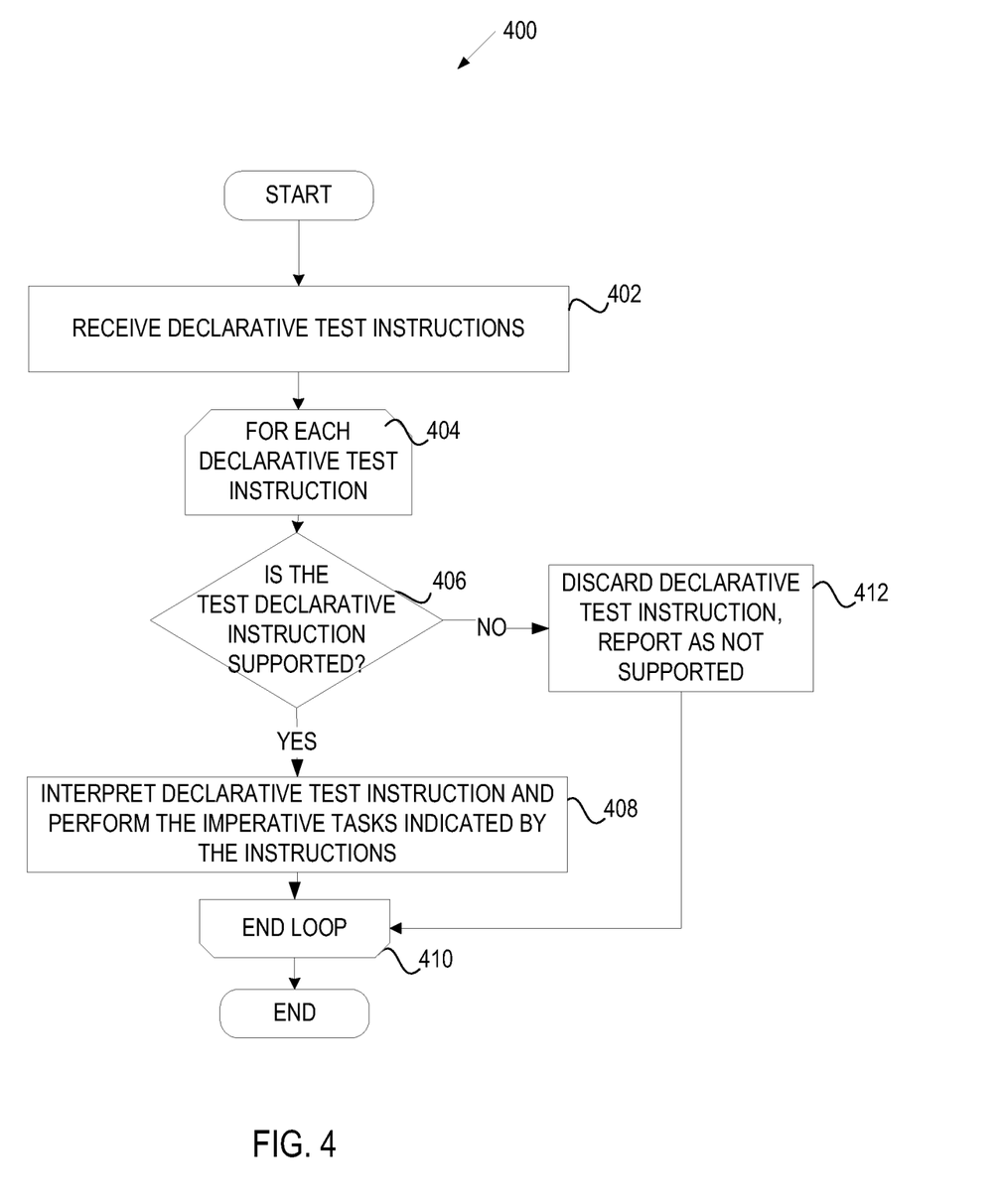
FIG. 4 is a flowchart of one embodiment of a process for interpreting declarative test instructions into imperative test tasks that can be used to run the test.

FIG. 4 is a flowchart of one embodiment of a process 400 for translating the declarative test instructions into imperative test tasks that can be used to run the test results. The process may be performed by processing logic that may comprise hardware (e.g., circuitry, dedicated logic, programmable logic, microcode, etc.), software (e.g., instructions run on a processing device to perform hardware simulation), or a combination thereof. In one embodiment, the process 400 is performed by a instruction processor, such as instruction processor 114 of test controller 108 of FIG. 1.

Referring to FIG. 4, process 400 begins with processing logic receiving the declarative test instructions. In one embodiment, the declarative test instructions process 400 receives are declarative test instructions that describe what is to be done by the test instructions as described in FIG. 1 above. For example, the declarative test instructions can specify running of a test, stopping a test, or temporarily pausing a running test, as described above in FIG. 2. Furthermore, process 400 executes a processing loop (blocks 404-412) to translate each of the received declarative test instructions. At block 406, process 400 determines if the declarative test instruction is supportable. For example and in one embodiment, in the interpreter, there are multiple 'if' branches recognizing individual commands. If none of the branches recognize the instruction, an unknown instruction is detected. For example and in one embodiment, process 400 determines if the current declarative test instructions are within a dictionary of known declarative test instructions.

If the test instruction is supported, process 400 interprets the declarative test instruction at block 408. For example, and in embodiment, process 400 creates a number of different task(s) based on the content of the declarative test instruction. In this embodiment, process 400 interprets the test instruction <performance address="http://localhost:8080/Ebws/PerfTest/EBWS" sender="HTTPSender" generator="DefaultMessageGenerator" message="5kB_ebws_reply.xml" count="5000" /> to create one or more tasks to run a performance test that retrieves a file 5000 times. In this example, the target of the test is retrieve the file 5000 times. Process 400 spawns one or more imperative tasks to run this test. For example, process 400 could spawn a single task to sequentially retrieve the specific file from one machine 5000 times. Alternatively, process 400 can spawn two or more tasks to run on one or multiple machines to retrieve the file 5000 times. In this way, process 400 is controlling the flow of the running of the tests and declarative test instructions indicate what tests need to be run instead of how the test should be run.

If the declarative test instruction is not supported, process 400 discards the declarative test instruction and reports that this declarative test instruction is not supported by the grammar. In one embodiment, process 400 signals an error and stops the processing loop. In another embodiment, process 400 shows a warning and ignores the instruction.

Figure 5A:
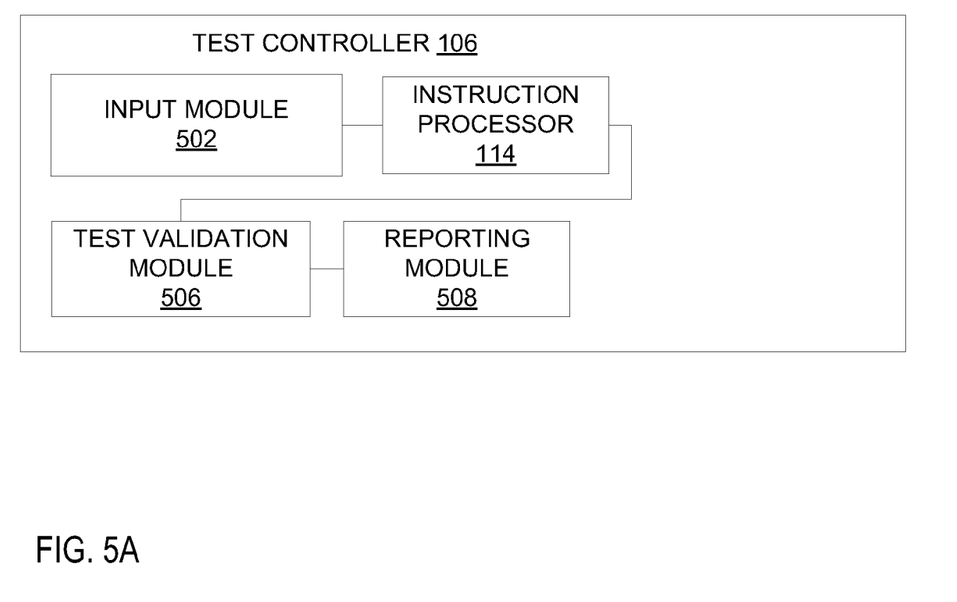
FIG. 5A is a block diagram of a test controller that is used for running tests using declarative test instructions.

FIG. 5A is a block diagram of a test controller 106 that is used for executing tests using declarative test instructions. In FIG. 5A, test controller 106 includes input module 502, instruction processor 114, test evaluation module 506, and reporting module 508. Input module 502 receives the declarative test instructions as described in FIG. 3, block 302. Instruction processor 114 translates the declarative test instructions into imperative test tasks and performs the imperative test tasks as described in FIG. 3, block 304. Test validation module 506 validates the test results as described in FIG. 3, block 306. Reporting module 508 reports the test results as described in FIG. 3, block 308.

Figure 5B:
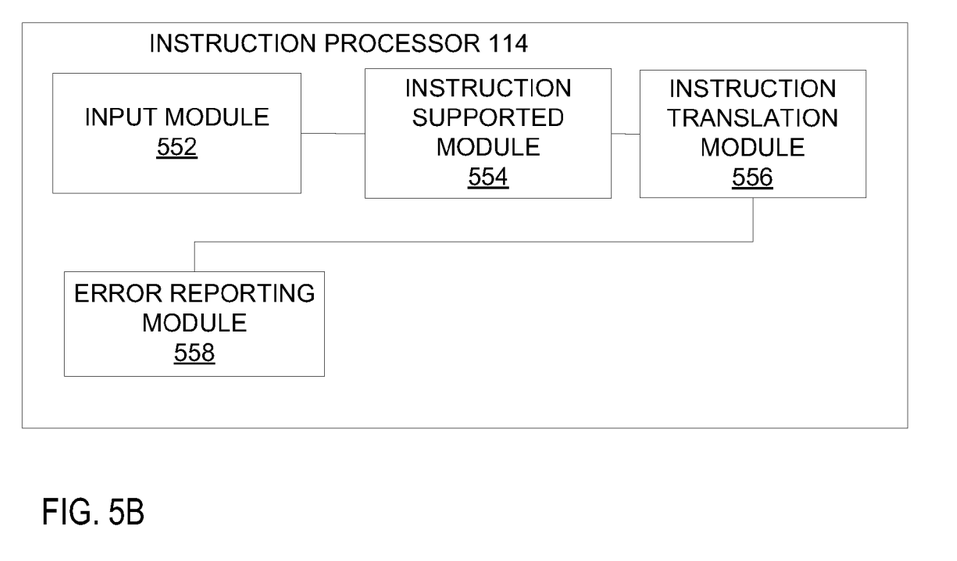
FIG. 5B is a block diagram of an instructions processor that translates the declarative test instructions into imperative test tasks.

FIG. 5B is a block diagram of a instructions processor 114 that is used to translate the declarative test instructions into imperative test tasks. In FIG. 5B, instruction processor 114 includes input module 552, instructions supported module 554, instruction translation module 556, and error reporting module 558. Input module 552 receives the declarative test instructions and test grammar as described in FIG. 4, block 402. Instructions supported module 554 determines if an individual declarative test instruction is supported as described in FIG. 4, block 406. Instruction translation module 556 translates the declarative test instruction into as set of imperative tasks and performs those tasks as described in FIG. 4, block 408. Error reporting module 558 reports errors in the test instruction translation as described in FIG. 4, block 412.

Figure 6:
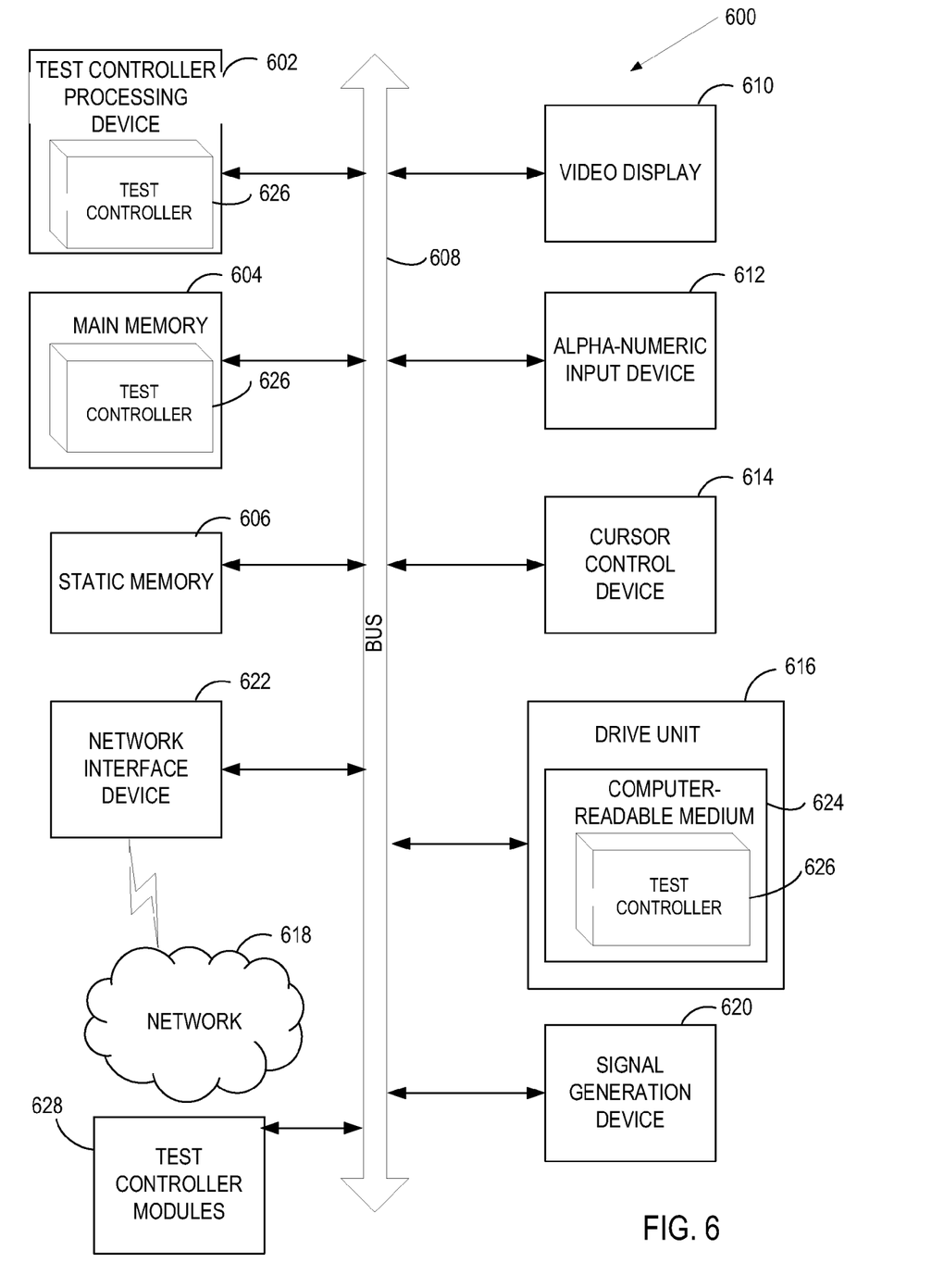
FIG. 6 is a diagram of one embodiment of a computer system for running tests using declarative test instructions.

FIG. 6 is a diagram of one embodiment of a computer system for executing tests using declarative test instructions. Within the computer system 600 is a set of instructions for causing the machine to perform any one or more of the methodologies discussed herein. In alternative embodiments, the machine may be connected (e.g., networked) to other machines in a LAN, an intranet, an extranet, or the Internet. The machine can operate in the capacity of a server or a client machine (e.g., a client computer processing test instructions and the server computer executing the processed test instructions) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or an machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a test controller processing device 602, a main memory 604 (e.g., read-only memory (ROM), flash memory, dynamic random access memory (DRAM) such as synchronous DRAM (SDRAM), etc.), a static memory 606 (e.g., flash memory, static random access memory (SRAM), etc.), and a secondary memory 616 (e.g., a data storage device in the form of a drive unit, which may include fixed or removable computer-readable storage medium), which communicate with each other via a bus 608.

Test controller processing device 602 represents one or more general-purpose processing devices such as a microprocessor, central processing unit, or the like. More particularly, the test controller processing device 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Test controlling processing device 602 may also be one or more special-purpose processing devices such as an application specific integrated circuit (ASIC), a field programmable gate array (FPGA), a digital signal processor (DSP), network processor, or the like. Test controlling test controller processing device 602 is configured to execute the test controller 626 for performing the operations and steps discussed herein.

The computer system 600 may further include a network interface device 622. The computer system 600 also may include a video display unit 610 (e.g., a liquid crystal display (LCD) or a cathode ray tube (CRT)) connected to the computer system through a graphics port and graphics chipset, an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions (e.g., the test controller 626) embodying any one or more of the methodologies or functions described herein. The test controller 626 may also reside, completely or at least partially, within the main memory 604 and/or within the test controller processing device 602 during execution thereof by the computer system 600, the main memory 604 and the test controller processing device 602 also constituting machine-readable storage media. The test controller 626 may further be transmitted or received over a network 618 via the network interface device 622.

The computer-readable storage medium 624 may also be used to store the test controller 626 persistently. While the computer-readable storage medium 624 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The test controller modules 628, components and other features described herein (for example in relation to FIG. 1) can be implemented as discrete hardware components or integrated in the functionality of hardware components such as ASICS, FPGAs, DSPs or similar devices. In addition, the test controller modules 628 can be implemented as firmware or functional circuitry within hardware devices. Further, the test controller modules 628 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "validating," "reporting," "outputting," "translating," "computing," "generating," "running," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A computer-readable storage medium includes any mechanism for storing information in a form readable by a computer. For example, a computer-readable storage medium includes read only memory ("ROM"), random access memory ("RAM"), magnetic disk storage media; optical storage media, flash memory devices or other type of machine-accessible storage media.

Thus, a method and apparatus for executing tests been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

We claim:

1. A method comprising:
providing a template for input of a validation test to be run in a computing system;
translating the template into an extended markup language (XML) formatted file comprising a declarative test instruction, the declarative test instruction to specify a configuration of a test client and a test server in the computing system, the validation test to be run and a previously executed process to be stopped;
determining, by a processing device, whether the declarative test instruction is supported by a test controller in the computing system by comparing the declarative test instruction to a dictionary of known declarative test instructions;
in response to determining that the declarative test instruction is supported by the test controller, interpreting, by the test controller, the declarative test instruction into a set of imperative test tasks, wherein the set of imperative test tasks indicate how the test is to be run;
determining, for the declarative test instruction, a first subset of the set of imperative test tasks that are to be run, a second subset of the set of imperative test tasks that roll back completed tests, and a third subset of the set of imperative test tasks to validate results of the tests; and
running the test using the first subset of the set of imperative test tasks.

2. The method of claim 1, further comprising:
generating test results;
validating the test results using the third subset of the set of imperative test tasks; and
reporting the results of the validating.

3. The method of claim 1, wherein the running of the test comprises executing the first subset of the set of imperative test tasks for each declarative test instruction.

4. The method of claim 1, further comprising:
validating the declarative test instruction.

5. The method of claim 1, wherein the set of imperative test tasks further indicate a control flow of the running of the test.

6. The method of claim 1, wherein the running comprises:
running the test to test an enterprise system bus server using the declarative test instruction.

7. A non-transitory computer readable storage medium having instructions stored thereon that, when executed by a processing device, cause the processing device to perform operations comprising:
providing a template for input of a validation test to be run in a computing system;
translating the template into an extended markup language (XML) formatted file comprising a declarative test instruction, the declarative test instruction to specify a configuration of a test client and a test server in the computing system, the validation test to be run and a previously executed process to be stopped;
determining, by the processing device, whether the declarative test instruction is supported by a test controller in the computing system by comparing the declarative test instruction to a dictionary of known declarative test instructions;
in response to determining that the declarative test instruction is supported by the test controller, interpreting, by the test controller, the declarative test instruction into a set of imperative test tasks, wherein the set of imperative test tasks indicate how the test is to be run;
determining, for the declarative test instruction, a first subset of the set of imperative test tasks that are to be run, a second subset of the set of imperative test tasks that roll back completed tests, and a third subset of the set of imperative test tasks to validate results of the tests; and
running the test using the first subset of the set of imperative test tasks.

8. The non-transitory computer readable storage medium of claim 7, wherein the operations further comprise:
generating test results;
validating the test results using the third subset of the set of imperative test tasks; and
reporting the results of the validating.

9. The non-transitory computer readable storage medium of claim 7, wherein the running of the test comprises executing the first subset of the set of imperative test tasks for the declarative test instruction.

10. The non-transitory computer readable storage medium of claim 7, wherein the operations further comprise:
validating the declarative test instruction.

11. The non-transitory computer readable storage medium of claim 7, wherein the set of imperative test tasks further indicate a control flow of the running of the test.

12. The non-transitory computer readable storage medium of claim 7, wherein the running comprises:
running the test to test an enterprise system bus server using the imperative test tasks.

13. A test controller comprising:
a memory to store a dictionary of known declarative test instructions; and
a processing device, coupled to the memory, the processing device to:
provide a template for input of a validation test to be run in a computing system;
translate the template into an extended markup language (XML) formatted file comprising a declarative test instruction, the declarative test instruction to specify a configuration of a test client and a test server in the computing system, the validation test to be run and a previously executed process to be stopped;
determine whether the declarative test instruction is supported by the test controller by comparing the declarative test instruction to the dictionary of known declarative test instructions;
in response to determining that the declarative test instruction is supported by the test controller, interpret a declarative test instruction into a set of imperative test tasks, wherein the set of imperative test tasks indicate how the test is to be run;
determine, for the declarative test instruction, a first subset of the set of imperative test tasks that are to be run, a second subset of the set of imperative test tasks that roll back completed tests, and a third subset of the set of imperative test tasks to validate results of the tests; and
run the test using the first subset of the set of imperative test tasks.

14. The test controller of claim 13, further comprising:
a test validation module to validate generated test results using the third subset of the set of imperative test tasks; and
a report module to report the results of the validating.

15. The test controller of claim 13, wherein processing device comprises:
a test instruction supported module to validate the declarative test instruction.

16. The test controller of claim 13, wherein the set of imperative test tasks further indicate a control flow of the running of the test.

* * * * *